United States Patent [19]

Corsetti

[11] 4,231,709
[45] Nov. 4, 1980

[54] DEMOUNTABLE TRANSPORTER FOR CONTAINERS

[75] Inventor: Richard M. Corsetti, Lynn, Mass.

[73] Assignee: Craig Systems Corporation, Lawrence, Mass.

[21] Appl. No.: 969,980

[22] Filed: Dec. 15, 1978

[51] Int. Cl.³ ............................................. B60P 3/40
[52] U.S. Cl. .................................. 414/458; 280/43.23; 280/404; 280/475; 280/476 R; 294/81 SF
[58] Field of Search ............................... 414/458, 459; 294/81 SF; 280/43.23, 404, 475, 476 R

[56] References Cited

U.S. PATENT DOCUMENTS

| 3,378,276 | 4/1968 | Fulmer | 280/43.23 |
| 3,631,999 | 1/1972 | Walerowski | 280/43.23 X |
| 4,139,228 | 2/1979 | Varadi | 294/81 SF X |

Primary Examiner—Robert G. Sheridan
Attorney, Agent, or Firm—Kenway & Jenney

[57] ABSTRACT

A demountable transporter for ISO containers has attaching elements with quick attachment latches including shear blocks, for insertion into the openings of the corner fittings, and locking plates, for insertion into the interior cavity of the corner fitting where they may be turned to secure the locking plate. Wheeled jacks are mounted on the lower attaching element of the transporter for easy movement of the transporter to the container and subsequent alignment. The two transporter sections may be joined together without the container by means of the lower attaching elements fastening to a joining block having openings like an ISO corner, and joining plates on the frames of the sections to which the upper attaching elements of opposite frames may be secured.

7 Claims, 18 Drawing Figures

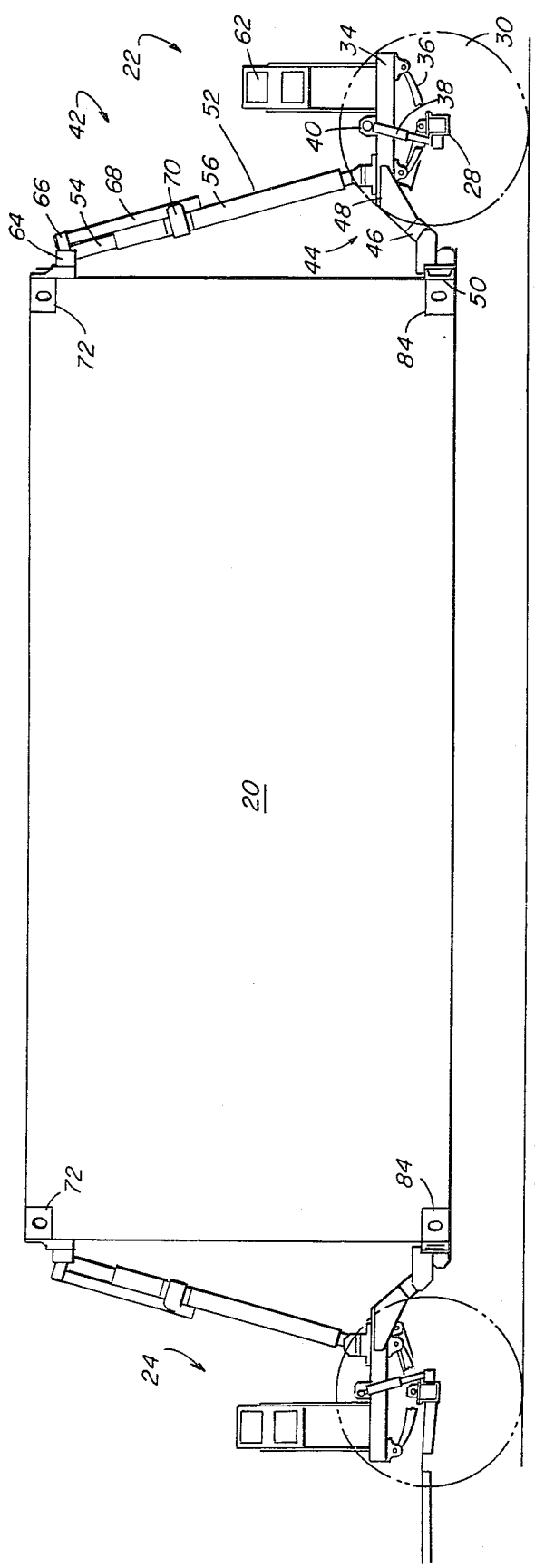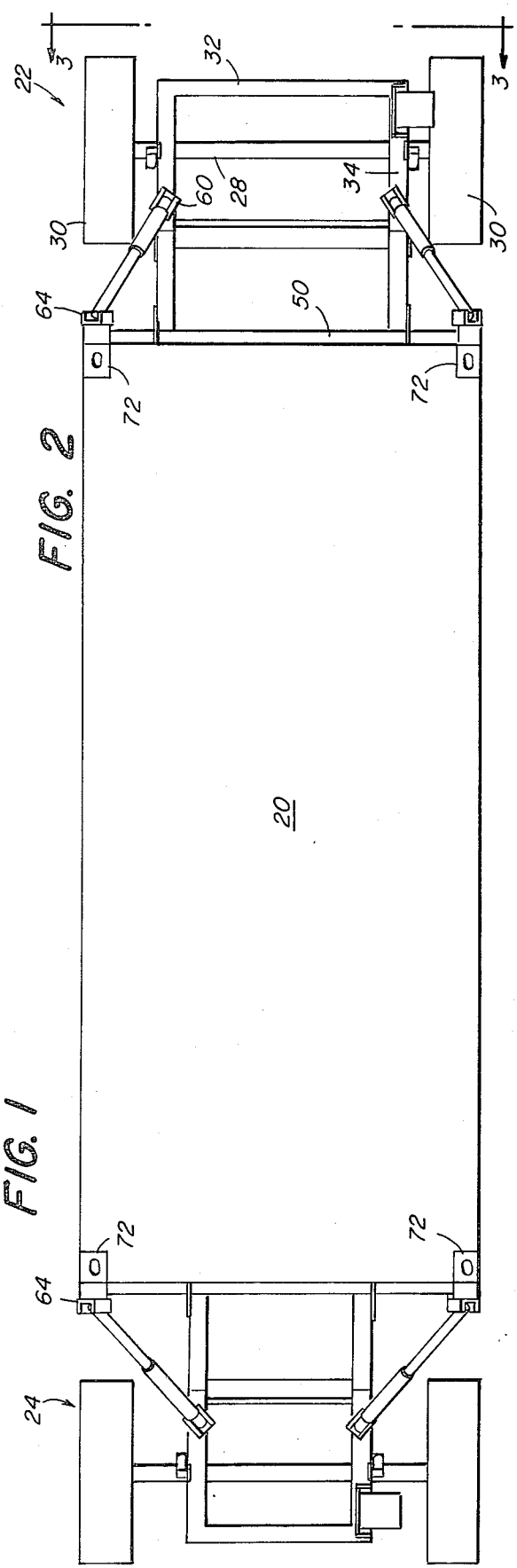
FIG. 1
FIG. 2

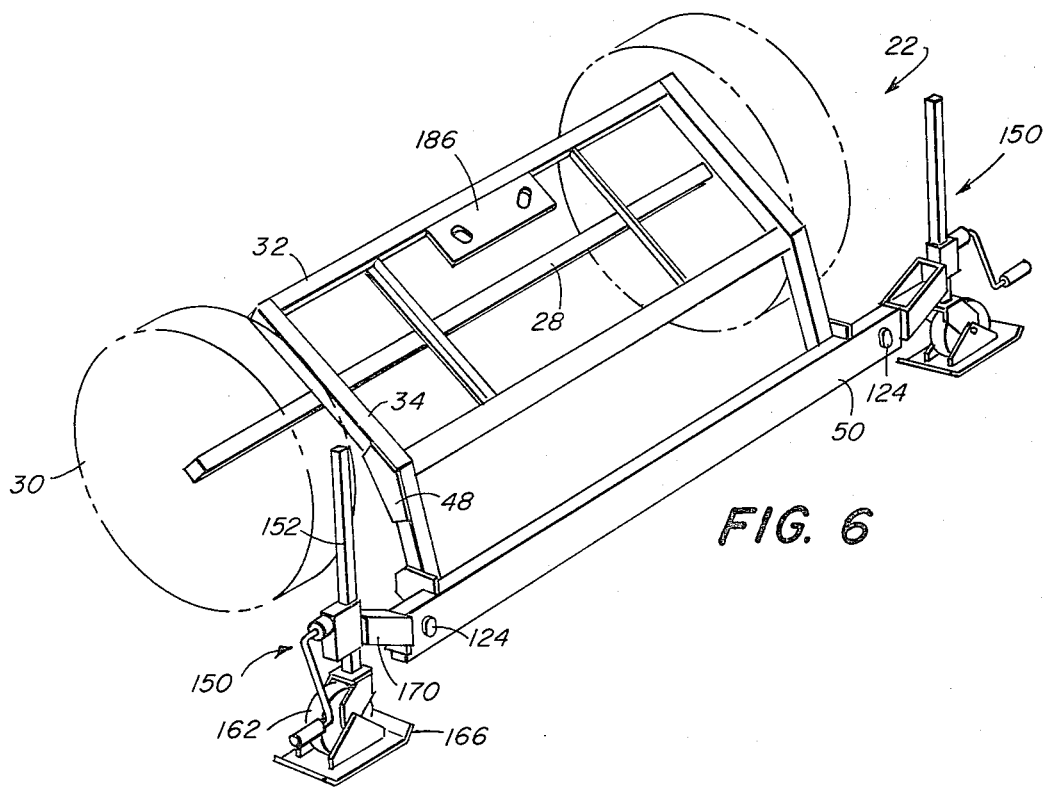
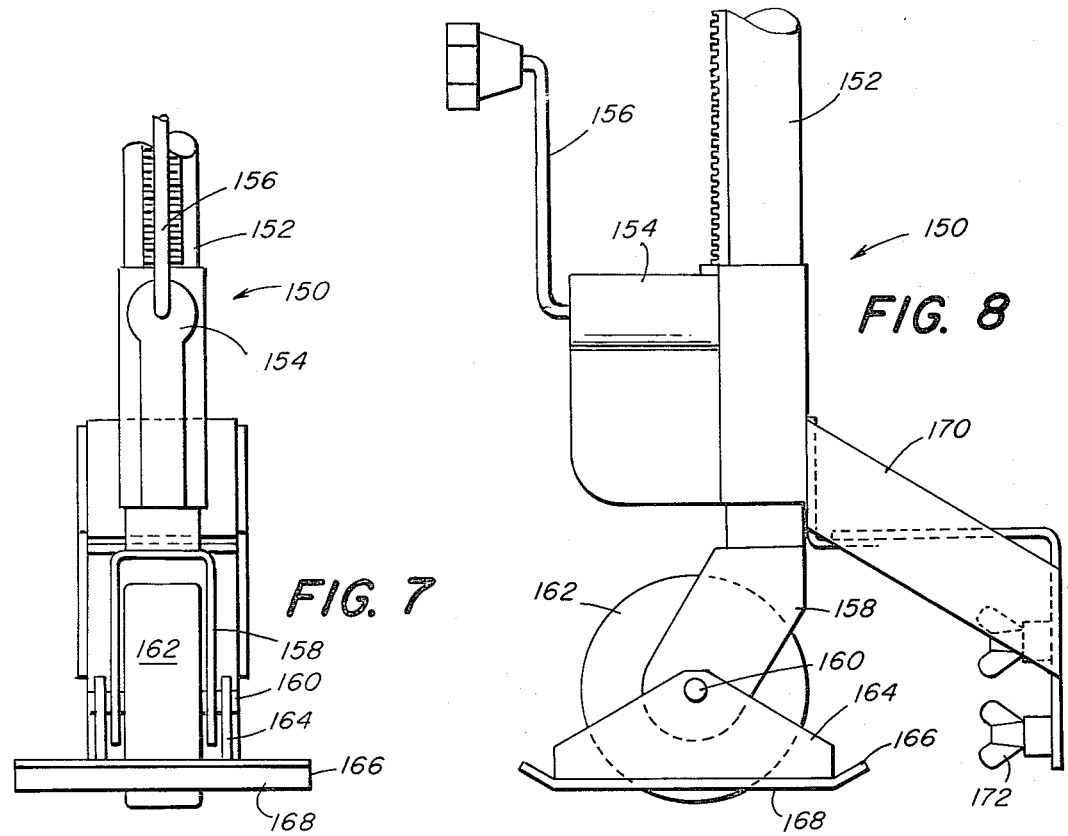

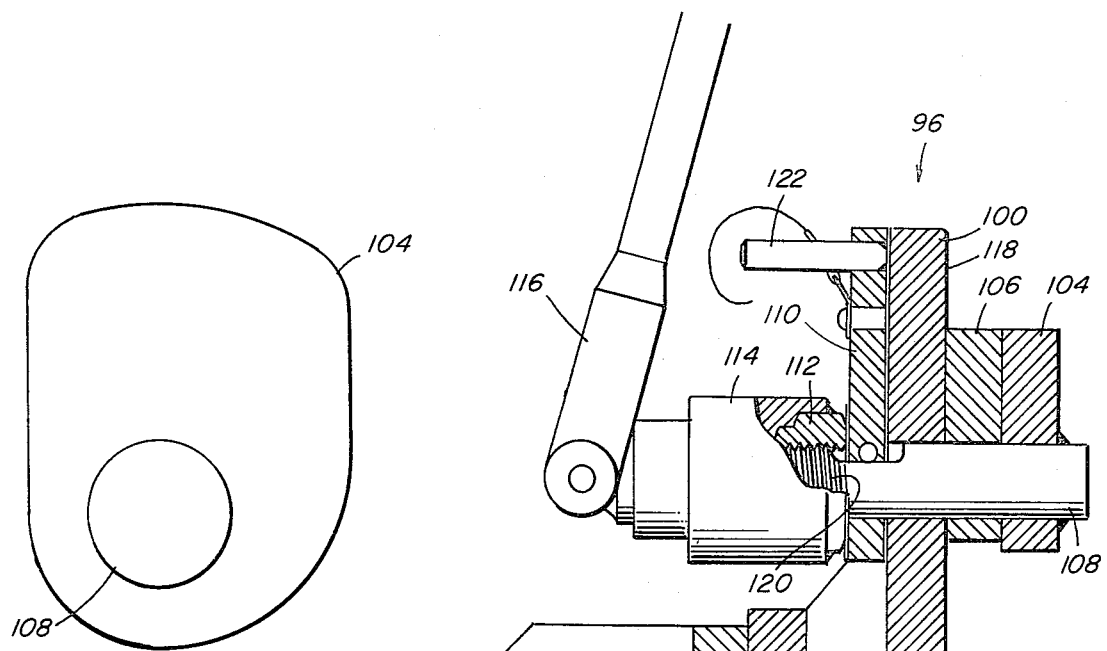
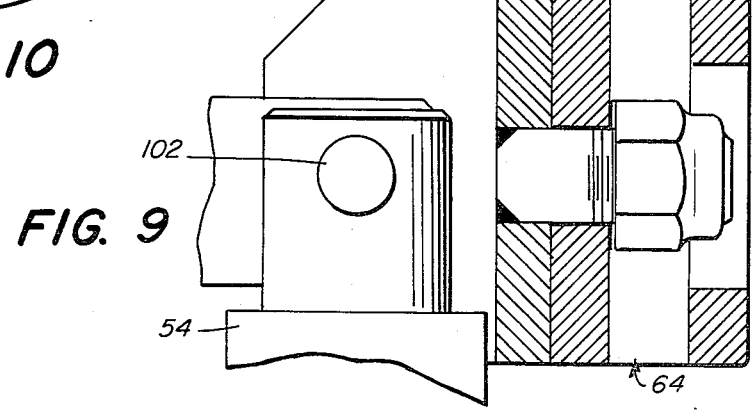
FIG. 10
FIG. 9
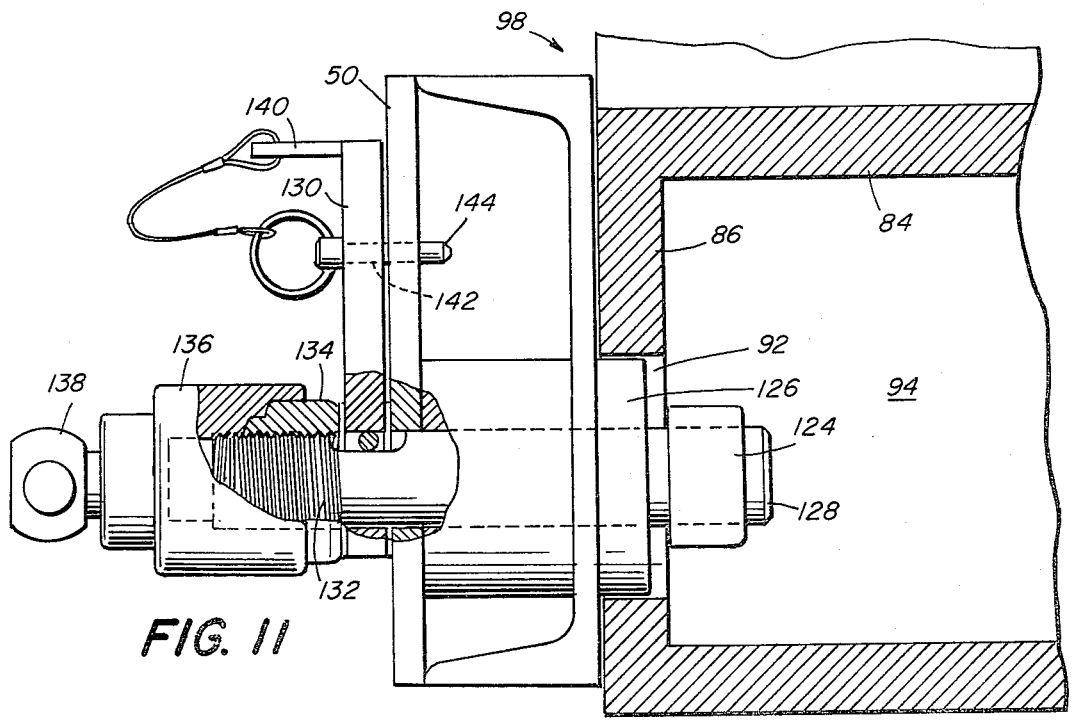
FIG. 11

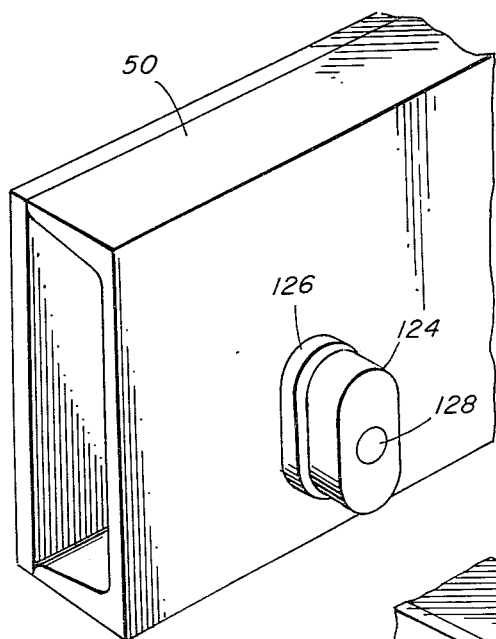
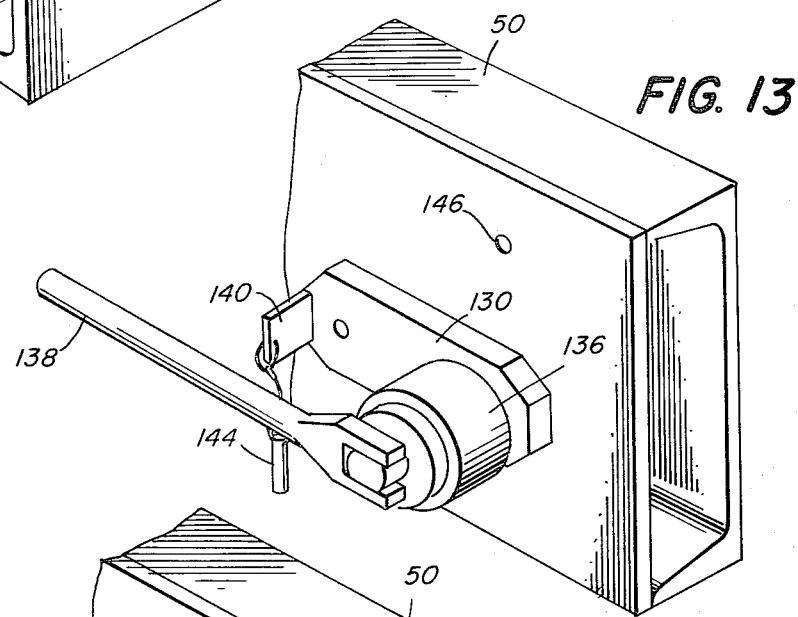
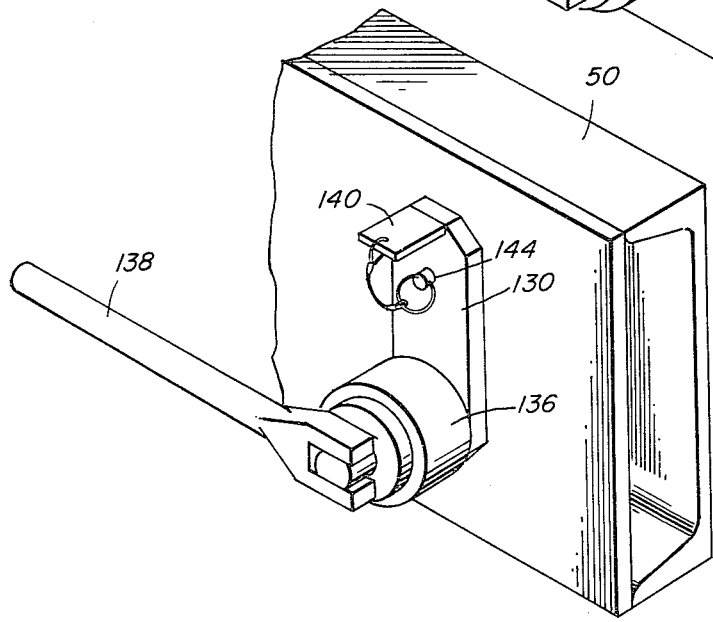

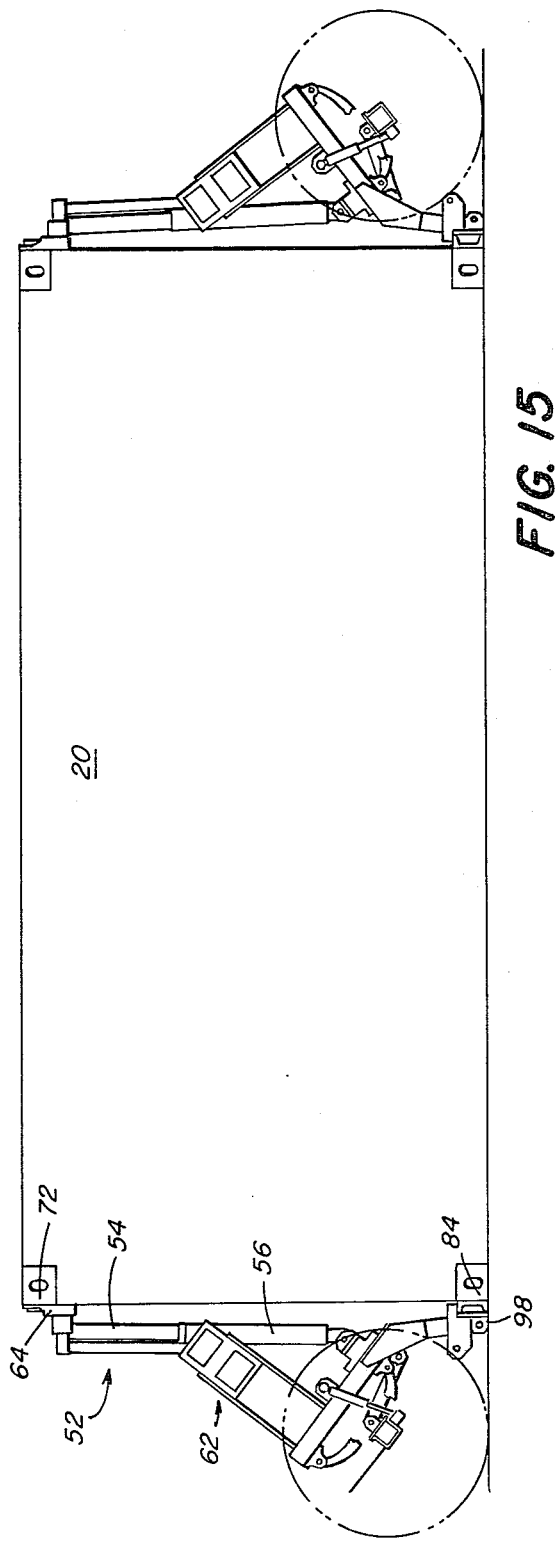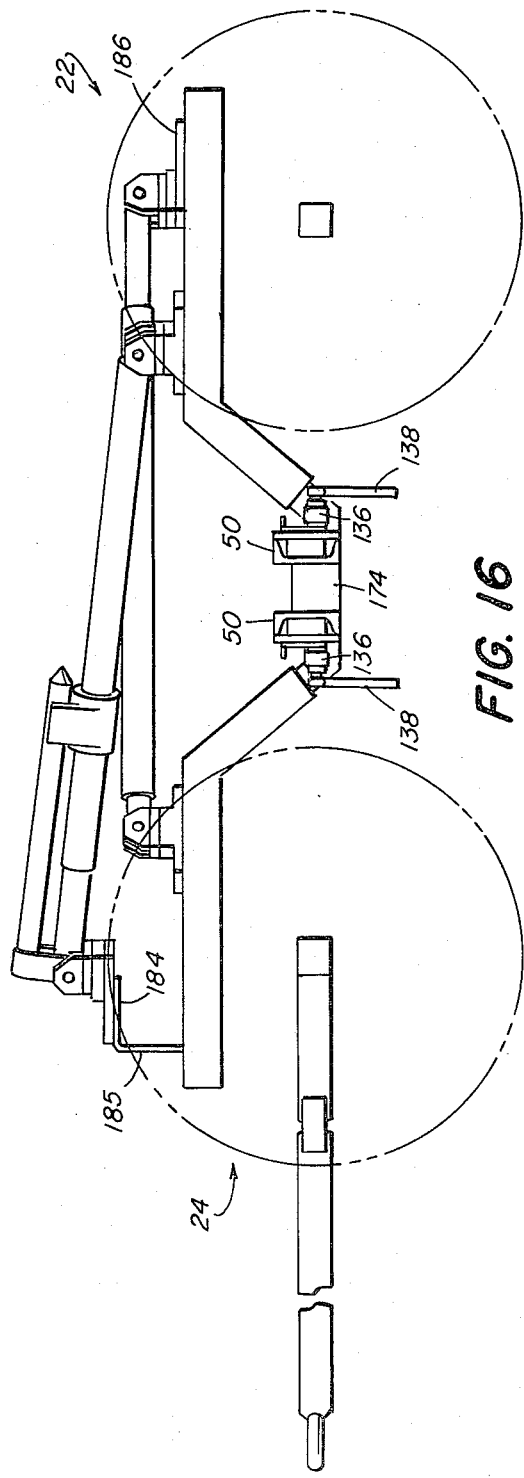

DEMOUNTABLE TRANSPORTER FOR CONTAINERS

BACKGROUND OF THE INVENTION

This invention relates generally to demountable transporters for containers, and particularly to transporters for containers bearing ISO corners that convert the containers into wheeled vehicles transportable over roads and other land surfaces.

Large freight containers have become popular for the secure transportation of goods and equipment. They confine and protect the contents from loss or damage. They can be separated from the means of transport, handled as a unit load and transhipped without rehandling the contents. International Organization for Standardization (ISO) containers are those that bear standard fittings of a particular configuration at the corners of the container for handling the containers during loading and unloading operations. The corners are engaged by the appropriate hoisting and moving equipment to lift and locate the container on container ships or specially designed railroad cars and flatbed trucks.

The containers ordinarily have corner posts located between pairs of upper and lower corners and longitudinal/transverse rails to join the upper and lower corner fittings. The severe structural loads which represent the loadings encountered in transit and loading operations are imposed on the containers through the corner fittings into the corner posts or rails.

For land transportation, the containers can be lifted onto flatbed trucks or trains and secured there. Another approach, however, is to take advantage of the structural strength of the container and attach wheeled transporters to turn the container itself into a wheeled unit suitable for towing. The use of such transporters reduces the need for large hoisting and moving equipment. They allow the conversion of containers of equipment into, in effect, mobile units.

The transporters, of course, must bear the load of the container during towing, and must have means for secure attachment to the container. Most transporters cannot be manipulated by one or two people for attachment to, or detachment from, a container. It would be desirable to have a transporter as easy to manage and attach as possible, without sacrificing its strength and security.

Accordingly, it is an object of this invention to provide demountable transporters for ISO containers that are easy to handle and use and provide quick, secure and solid attachment to the container.

It is another object of the invention to provide transporters that may be easily moved and positioned next to containers in alignment with the appropriate fittings.

It is another object of the invention to provide means for attachment of the transporter to the container that are easy to use but nevertheless provide great security during towing, by utilizing the features of standard ISO corners.

It is another object of the invention to provide transporters that can be joined one to the other so that the transporter itself can be formed into a unit, without a container, and be easily towed and stored.

SUMMARY OF THE INVENTION

The invention provides transporters for use with a ISO container bearing ISO corner fittings. These fittings have plates with openings leading into an interior cavity. The transporters are wheeled units with frames supporting upper and lower attachment means that include plates having latches or fasteners for fastening to the upper and lower corner fittings. The fasteners are locking plates about the size and configuration of the corner fitting openings. The locking plates are mounted on rods extending back through the attachment means plates. Shear blocks, also in the general configuration of the corner fitting opening, are mounted on the plates too. The rod has a threaded end which extends through the attachment means to a nut and wrench, so that the locking plate may pass through the corner fitting opening into its interior, and be turned so that it cannot pass back through, the shear block residing in the corner fitting opening, and the nut brought up by the wrench to bring up the locking plate on the interior surface of the corner fitting.

The lower unit brackets are supported by wheeled jacks, the jacks permitting the bracket to be raised or lowered to align with the lower corner fittings. The unit furthermore has a joining block — a block with openings corresponding to the lower corner fittings on each side of it. The block is placed between the lower attachment means to permit the fastening means to be inserted into the joining block and secured there in the absence of a container, joining the two transporters together. Joining plates are mounted on the units at appropriate locations, also bearing openings corresponding to the upper corner fittings, so that the fastening means at the ends of the upper attachment means may be secured to them.

BRIEF DESCRIPTION OF THE DRAWING

FIG. 1 is an elevation view of a container secured to a transporter and ready for road travel;

FIG. 2 is a plan view of the container and transporter of FIG. 1;

FIG. 6 is a perspective view of a transporter dolly unattached to a container;

FIG. 7 is an end view of a sub-assembly including a wheel and jack;

FIG. 8 is an elevation view of the sub-assembly of FIG. 7;

FIG. 9 is a detail elevation view, partially in cross-section, of the upper latch assembly of a transporter dolly showing it in the unlocked position;

FIG. 10 is a plan view of the lock plate of the upper latch assembly of FIG. 9;

FIG. 11 is an elevation view, in cross-section, of a lower latch assembly, illustrating its attachment to a lower corner fitting of an ISO container, in the locked position;

FIG. 12 is a detail perspective view of the front of a lower latch assembly, showing the lock plate and shear block, showing the latch in the unlocked position;

FIG. 12 is a detail perspective view of the same lower latch assembly from the rear; showing the latch in the unlocked position;

FIG. 14 is a view like that of FIG. 13, showing the latch in the locked position;

FIG. 15 is an elevation view of the dollies of a transporter attached to an ISO container at rest on a surface;

FIG. 16 is an elevation view of the dollies of a transporter joined to each other;

DETAILED DESCRIPTION OF A PREFERRED EMBODIMENT

Figure 3:
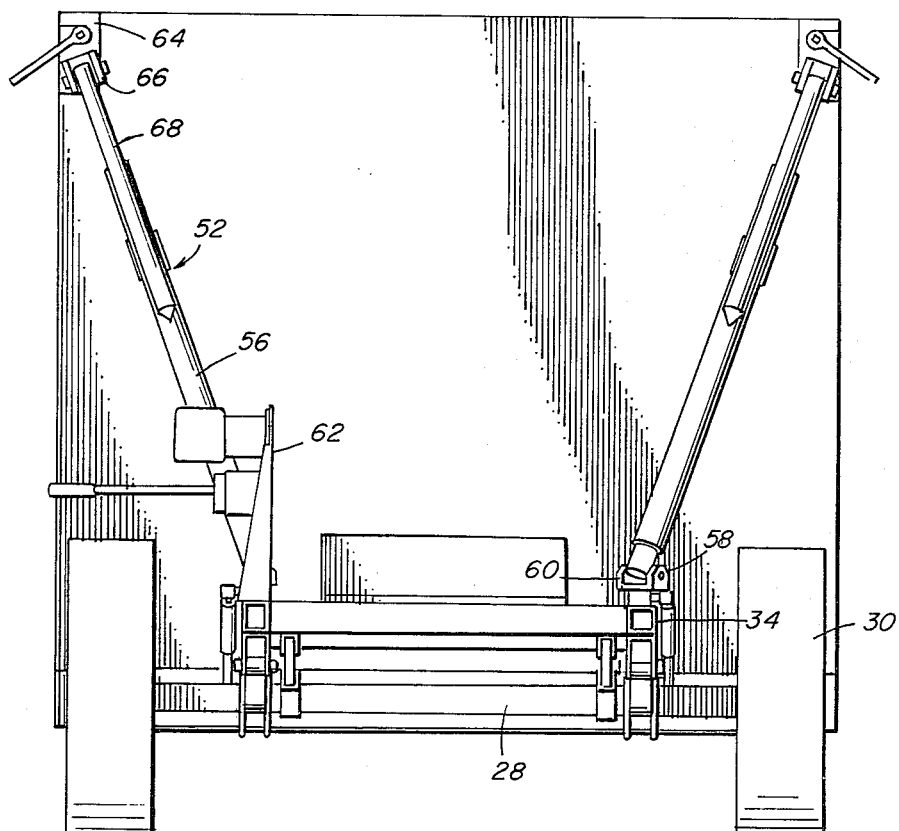
FIG. 3 is an end view of the container and transporter of FIGS. 1 and 2, along the line 3—3.

FIGS. 1, 2, and 3 show an ISO container 20 supported in a road traveling position by a transporter made up of a trailing dolly 22 and a towing dolly 24. In some of these Figures, as well as other of the drawings, some parts will be omitted or shown in dotted lines, for the sake of clarity. The towing dolly includes a drawbar for attachment to a suitable vehicle such as a truck (not shown). Except for some minor differences to be referred to later, the trailing dolly 22 and towing dolly 24 are identical. The references to the components of the dollies will be made by referring to the trailing dolly 22 shown in FIG. 3 and FIG. 6, but it will be understood that the components described appear in the towing dolly 24 as well.

Dolly 22, then, can be seen to be supported by an axle 28 between two tires 30. The dolly consists primarily of a frame structure including tubular frame members 32 parallel to the axle, joined by transverse tubular frame members 34. A leaf spring 36 supports the frame members 34 above axle 28 and a shock absorber 38 extends from axle 28 to bracket 40 on frame members 34. Various and miscellaneous fixtures such as brake lights that appear on dollies typically used in these procedures have been omitted or will not be described for the sake of clarity.

Dolly 22 has extending from it toward container 20 an upper attaching means 42 and a lower attaching means 44. The lower attaching means 44 include tubular members 46 extending downwardly from the end of frame member 34 to which they are joined by a gusset plate 48. Tubular members 46 are pivotally attached to a tubular member or bracket 50, which extends parallel to the axle and for the width of container 20.

Upper attaching means 42 include a pair of hydraulic ram assemblies 52. Each assembly includes a plunger 54 and a cylinder 56. The base of cylinder 56 is secured by a horizontal pin 58, about which it is rotatable, in swivel mount 60. Swivel mount 60 is rotatable about a pin (not shown) inserted into a transverse frame member 34. Hydraulic ram assembly 52 is thereby free to swivel in all directions around its mount on frame member 34. Hydraulic connections from the hydraulic ram assembly 52 to hydraulic pump and control 62 are not shown. They are the common connections known to those skilled in the art. Plunger 54 whose extension out of cylinder 56 is determined by the hydraulic pump and controls 62 is shown with a bracket assembly 64 at its remote end. Also connected to bracket assembly 64 via a mounting 66 is a lock out bar 68 which extends down the hydraulic ram assembly. It includes a bracket not shown connected to cylinder bracket 70.

Figure 4:
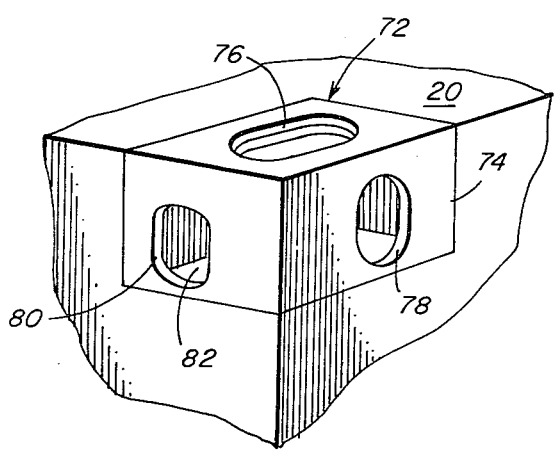
FIG. 4 is a detailed perspective view of an upper corner fitting of an ISO container.
Figure 5:
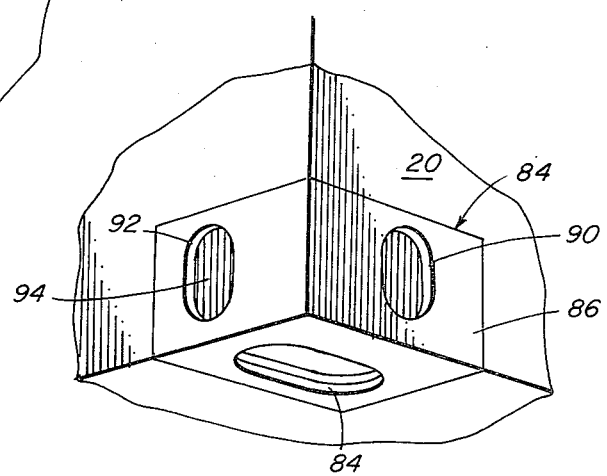
FIG. 5 is a similar view of a lower corner fitting.

Container 20, as an ISO container, has standard corner fittings prescribed by the International Organization for Standardization. The fittings are illustrated in FIGS. 4 and 5. FIG. 4 shows an upper corner fitting 72. The fitting is attached to container 20 by conventional means. Upper corner fitting 72 is a box-like structure having an outside plate 74 with three openings 76, 78, and 80 leading into an interior cavity 82. Opening 76 is at the top of the fitting, opening 78 at the side and opening 80 to the end of container 20. FIG. 5 shows a lower corner fitting 84. It too is a box-like structure with an outside plate 86 and three openings 88, 90, and 92, on the bottom, side, and end of container 20, respectively all leading into an interior cavity 94.

FIGS. 9 and 11 show details of the upper latch assembly 96 connected to the upper bracket 64 and the lower latch assembly 98 attached to the lower bracket 50. Turning to the upper latch assembly 96 shown in FIG. 9 first, a latch plate 100 is shown extending up from where it is mounted on bracket assembly 64, not described in detail. Bracket assembly 64 is rotatable about a pin 102 through the end of plunger 54. The important elements of the upper latch assembly 96 are the latch plate 100, the lock plate 104, shear block 106, rod 108, lock handle 110, nut 112, and socket 114 with handle 116. Lock plate 104 is shown from the front in FIG. 10. It is generally in the configuration of opening 80 of the upper corner fitting. Lock plate 104 is mounted on rod 108. Shear block 106, in depth substantially equal to the width of corner plate 74, is welded to the face 118 of latch plate 100. Rod 108 extends through shear block 106 and latch plate 100. On the other side of latch plate 100 the lock handle 110 is unrotatably mounted on the rod. Beyond the lock handle 110 is a portion 120 of the rod that is threaded, nut 112, threadedly connected to threaded portion 120, and socket 114 with its handle 116, mated with the nut 112. Shear block 106 has the same general configuration as lock plate 104. As shown in FIG. 9, the lock plate 104 and shear block 106 are generally aligned. Lock handle 110 is shown with an extension 122 for easier manipulation.

FIG. 11 shows the lower latch assembly 98 connected to lower corner fitting 84. The assembly is mounted on lower bracket 50. Like the upper latch assembly 96, the lower assembly includes a lock plate 124, a shear block 126, in depth substantially equal to the width of corner plate 86, a rod 128, and, on the other side of the bracket, a lock handle 130 nonrotatably mounted on the rod, and beyond the lock handle a threaded portion 132 of the rod on which is mounted a nut 134 held within a socket 136 having a handle 138. Lock handle 130 includes an extension 140 for ease of manipulation of the lock handle. It also includes a hole 142 passing through the upper central portion of the lock handle. The lower latch assembly 98 shown in FIG. 11 is in the locked position; the elongated lock plate 124 is turned within the lower corner fitting so that is longer dimension is horizontal and its edges overlap the interior of the opening in the horizontal direction. In that position the lock handle 130 is in the vertical orientation and pin 144 passes through the hole 142 in the lock handle. FIG. 14 shows the position of the lower latch assembly in the locked position from the other side of bracket 50 (without showing the corner fitting). FIGS. 12 and 13 show views of the lower latch assembly 98 in the unlocked position, in which lock plate 124 lines up with shear block 126. FIG. 13 shows the assembly from the other side of bracket 50 showing further a hole 146 into which the lock handle pin 144 is inserted during the locking procedure.

FIG. 6 shows the trailing transporter dolly 22 unattached to container 20, with some parts eliminated for clarity. Shown attached to either end of the lower mounting bracket 50 are two wheeled jack assemblies 150. FIGS. 7 and 8 show the jack assemblies in greater detail. The jack assemblies include a post 152 up and down which a rack 154 travels by manipulation of the crank 156 in a conventional manner. The lower portion of the post 152 is mounted on a bracket 158 supporting an axle 160 on which a wheel 162 is mounted. Also mounted on axle 160 is a lower bracket 164 incorporating a shoe 166 having a lower surface 168 above the lowest point of the wheel 162. Connected to rack 154 is a mounting bracket 170 including holes for winged nuts 172. Winged nuts 172 connect the jack assembly 150 to the lower mounting bracket 50 as shown in FIG. 6.

Figure 17:
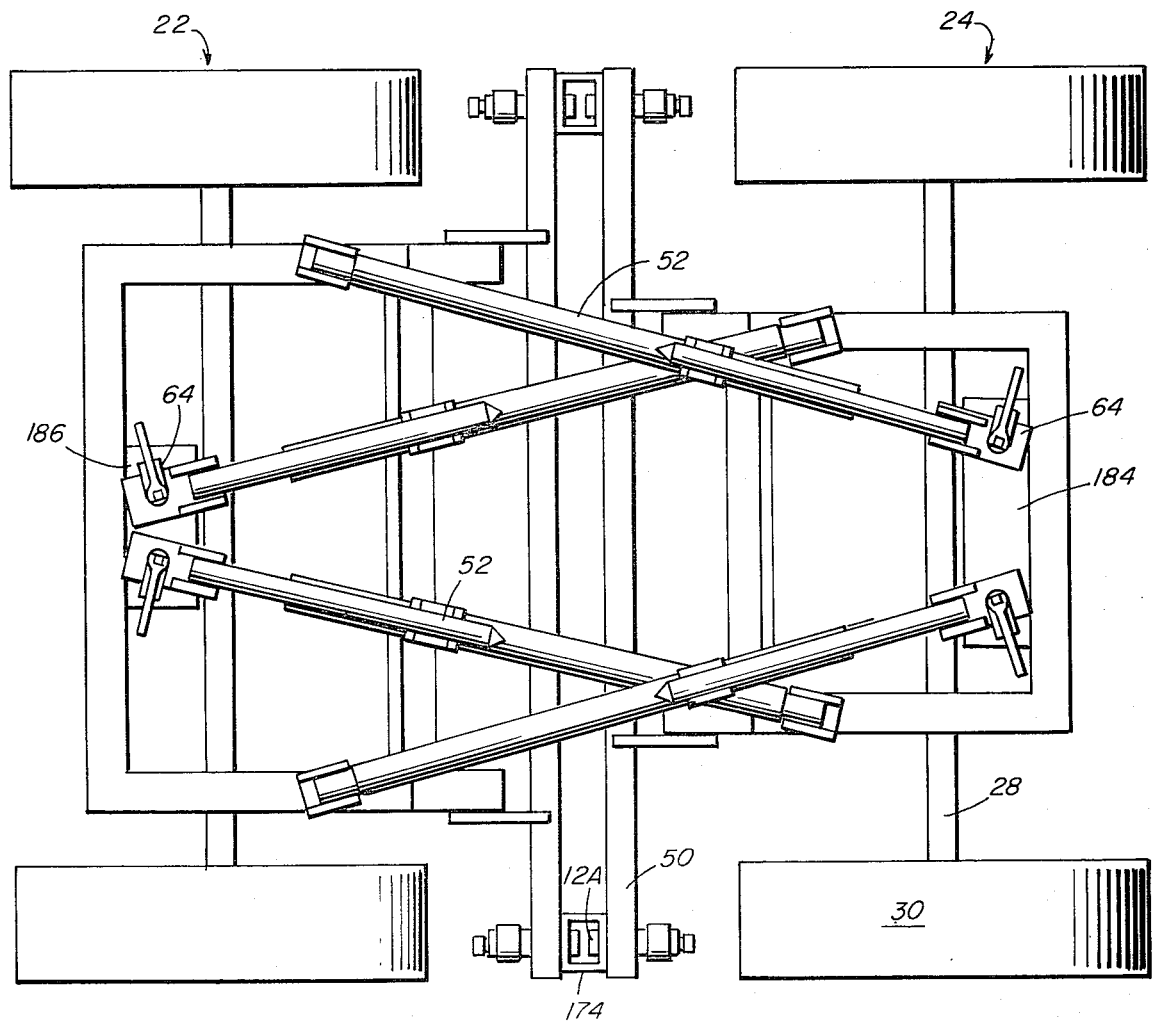
FIG. 17 is a plan view of the assembly of FIG. 16.
Figure 18:
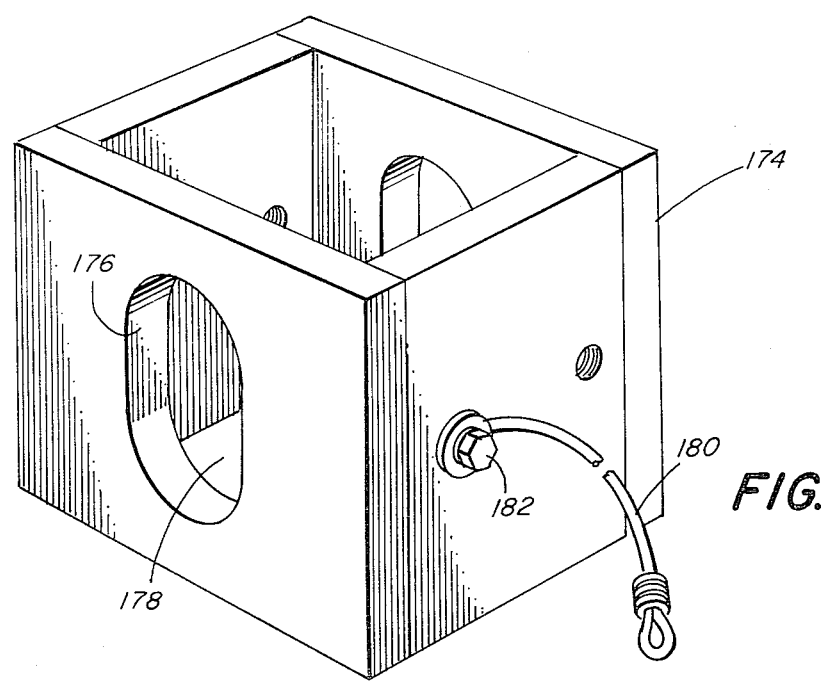
FIG. 18 is a detail perspective view of a joining block used in the assembly of FIGS. 16 and 17.

FIGS. 16 and 17 show the two dollies 22 and 24 of the transporter connected to each other without a container 20. The lower brackets 50 of each dolly face each other with a joining block 174 in between. A joining block 174 is shown in great detail in FIG. 18. It is essentially a tubular structure, rectangular in cross section, having on opposite faces openings 176 corresponding in configuration to the openings 92 of the lower corner fitting of an ISO container. There is ample room in the interior space 178 of the joining blocks for the locking plates 124 of lower latch assemblies 98 of lower brackets 50 of both the trailing dolly 22 and towing dolly 24. Joining block 174 shows a wire loop 180 on the nut 182 on the lock to be hung from some appropriate surface on the dolly when it is not in use.

Joining plates 184 and 186 are mounted on towing dolly 24 and trailing dolly 22 respectively. Each joining plate 184, 186 has a flat portion approximately the thickness of the plate of a corner fitting and includes openings corresponding to the openings 80 of an upper corner fitting 72. As shown in FIGS. 16 and 17 the hydraulic ram assemblies 52 of opposite dollies lay down so that the bracket assemblies 64 at their ends are attached to joining plates 184 and 186. One of the joining plates, in this case joining plate 184, has a vertical section 185 so that one set of hydraulic ram assemblies can be raised over the other set.

The use and operation of the transporter can be described beginning with the reference to FIG. 6 and FIG. 15. FIG. 6 shows the trailing dolly 22 before attachment to the container. The distribution of components of the dolly 22 is such that the center of gravity of the assembly is displaced from over the axle 28. The wheels 162 of the wheel jack assembly 150 support the weight of the dolly frame in addition to the tires 30 so that the dolly is stable and can be maneuvered by two people. The dolly 22 is then brought up to container 20 resting on the ground as in FIG. 15. The shoes 166 mounted on wheels 162 allow maneuvering of the dolly even on soft surfaces where wheels 162 are not adequate. The shoes 166 allow sliding over sand or soft ground if necessary.

Once positioned next to container 20, use of crank 156 of the jack assembly 150 will raise or lower bracket 50 to which the jack is attached. This will allow alignment of the lower latch assemblies 98 with lower corner fittings 84, whether container 20 is resting on the ground, on an uneven surface, or pallet. There is a limit of adjustability of the vertical distance of bracket 50 that is set only by the length of the post 152 of the jack assembly 150. When the lower latch assembly 98 is aligned with lower corner fitting 84, assembly 98 is thrust forward, the lock plate 124 being aligned with the shear block 126 for passage into the opening 92 of the fitting. Shear block 126 rests in the opening 92. lock handle 130 is turned from the position shown in FIG. 13 to that shown in FIG. 14 so that lock plate 124 is turned 90° in the interior cavity 94 of the lower corner fitting. Pin 144 is passed through hole 142 of the handle 130 into hole 146 of bracket 50 to secure the lock handle. Handle 138 is then turned to turn nut 134 on the threaded portion 132 of rod 128 bringing up lock plate 124 on the inside surface of plate 86 of the lower corner fitting.

With the lower latch assembly 98 secured, the hydraulic ram assemblies 52, which are a major component of the upper attaching means 42 are then maneuvered so that bracket assembly 64 is lined up with the upper corner fittings 72. Without the hydraulic pump in control 62 being active, plunger 54 moves easily in and out of cylinder 56 so that the alignment can be accomplished. The upper latch assembly is secured to the upper corner fittings in much the same way as was described for the lower latch assembly and lower corner fittings. Lock plate 104 and shear block 106 are inserted into the opening 80 of upper corner fitting 72, lock plate 104 is turned 90° via lock handle 110, the shear block 106 residing in the opening 80 of the fitting, and handle 116 is turned so that socket 114 turns nut 112 on the threaded portion of rod 108 to bring up lock plate 104 on the inside of plate 74 of the upper corner fitting.

After the connection of the dollies 22 and 24 to container 20, the wheels of jack assembly 150 are removed by disconnection of the winged nuts 172 from bracket 50. Operation of the hydraulic ram assemblies 52 by hydraulic pump and controls 62 then results essentially in a change of geometry of the members of the dolly assemblies so that container 20 is raised from the position shown in FIG. 15 to that shown in FIG. 1. Hydraulic ram assembly 52 may be locked in the position shown in FIG. 1 at the desired road height by use of the lock-out bar 62 being held to the cylinder bracket 70 by, for example, a pin not shown.

The dollies 22 and 24 are thus seen by virtue of the addition of the wheeled jack assemblies 150 to be easily maneuverable up to container 20 and are easy to align with the corner fittings of the container by manipulation of the jack, making bracket 50 vertically adjustable. The upper latch assembly 96 and lower latch assembly 98 have elements that allow the rapid securing of the upper and lower attaching means through the corner fittings, easy manipulation of the elements to the locking position, and a quick securing of the elements in the locked position.

Without the container 20, dollies 22 and 24 can be assembled and be transported as a unit. Joining block 174 is simply placed between opposing lower latch assemblies 98 of the two dollies. The assemblies are secured to the joining block 174 in the same way as they would be to lower corner fitting 84. The full strength of the lower latch assembly is utilized in this subsidiary procedure for joining the two dollies together. The upper attaching 42 or hydraulic ram assemblies 52 assist in joining the assemblies in a similar fashion by having the upper latch assemblies 98 join to joining plates 184 and 186.

While this particular embodiment, and features of the invention, have been described here variations can be imagined and put into use by those skilled in the art. Such variations are contemplated and are considered to fall within the scope of the invention as defined by the following claims.

I claim:
1. A demountable transporter assembly for use with a container having ISO corners, each said corner comprising a plate mounted on said container to define an interior cavity, said plate further forming an opening to said interior cavity, said assembly comprising:
- an axle and two wheels supporting said axle,
- a frame supported by said axle,
- lower attachment means, supported by said frame and including a plate having a surface facing toward said container,
- upper extendable attachment means pivotally supported by said frame, including a plate having a surface facing toward said container,
- each said attachment means including fastener means,
- said fastener means including a shear block mounted on said attachment means surface having a depth substantially equal to the width of said corner plate and a configuration substantially similar to said corner plate opening,
- a lock plate of the same general configuration as said shear block,
- and a rod on which said lock plate is mounted, passing through said shear block and attachment means plate, said rod being rotatable and slidable so that in a first position said lock plate and shear plate are aligned for entering said corner plate opening, and in a second position said lock plate is turned to overlap said opening,
- and means for securing said lock plate in said second position.

2. The assembly of claim 1 further including a joining block including a plate defining an interior cavity and having oppositely facing openings leading into said cavity, to which said fastener means of said lower attachment means of two said assemblies facing each other may be fastened.

3. The assembly of claim 2 in which said openings are substantially similar in shape to the said openings of said ISO corners.

4. The assembly of claim 1 further including a joining plate mounted on said frame, said joining plate having openings through which said fastener means locking plate can enter, so that said locking plates of said upper attachment means of another assembly may be fastened to said joining plate.

5. The assembly of claim 4 in which said openings are substantially similar in shape to the said openings of said ISO corners.

6. A demountable transporter assembly for use with a container having upper and lower corner fittings, said assembly comprising:
- an axle and two wheels supporting said axle,
- a frame supported by said axle,
- two arms connected to said frame, each said arm including upper fastening means for attachment to one of said upper corner fittings,
- a bracket support member mounted on said frame,
- a bracket mounted on said member for rotational movement about an axis parallel to said axle
- said bracket including lower fastening means mounted on each end for attachment to said lower corner fittings,
- at least two auxiliary support means, each adjustable in height, supporting said bracket, each said support means having a wheel on which it is supported, and
- at least one joining block having opposite faces bearing fittings substantially like said lower corner fittings, to which said lower fastening means can be attached.

7. A demountable transporter assembly for use with a container having ISO corners, each said corner comprising a plate mounted on said container to define an interior cavity, said plate further forming an opening to said interior cavity, said assembly comprising:
- an axle and two wheels supporting said axle,
- a frame supported by said axle,
- lower attachment means, supported by said frame and including a plate having a surface facing toward said container,
- upper extendable attachment means pivotally supported by said frame, including a plate having a surface facing toward said container,
- each said attachment means including fastener means,
- said fastener means including a shear block mounted on said attachment means surface having a depth substantially equal to the width of said corner plate and a configuration substantially similar to said corner plate opening,
- a lock plate of the same general configuration as said shear block,
- and a rod on which said lock plate is mounted, passing through said shear block and attachment means plate, said rod being rotatable and slidable so that in a first position said lock plate and shear plate are aligned for entering said corner plate opening, and in a second position said lock plate is turned to overlap said opening,
- and means for securing said lock plate in said second position,
- said rod including a threaded portion extending beyond said attachment plate, and said securing means including a nut threadedly connected to said portion for bringing up said rod.

* * * * *